(12) United States Patent
Feng et al.

(10) Patent No.: US 8,452,818 B2
(45) Date of Patent: May 28, 2013

(54) DIMENSION-BASED RELATION GRAPHING OF DOCUMENTS

(75) Inventors: Zhichun Feng, Shanghai (CN); Wuzhen Xiong, Shanghai (CN); Zhigang Chang, Shanghai (CN); Catherine Ye, Shanghai (CN)

(73) Assignee: Business Objects Software Limited (IE)

( * ) Notice: Subject to any disclaimer, the term of this patent is extended or adjusted under 35 U.S.C. 154(b) by 87 days.

(21) Appl. No.: 12/876,178

(22) Filed: Sep. 6, 2010

(65) Prior Publication Data

US 2012/0005242 A1 Jan. 5, 2012

(30) Foreign Application Priority Data

Jul. 1, 2010 (CN) .......................... 2010 1 0214477

(51) Int. Cl.
*G06F 7/00* (2006.01)
*G06F 17/30* (2006.01)

(52) U.S. Cl.
USPC ........... 707/805; 707/778; 707/797; 707/798; 707/956

(58) Field of Classification Search
USPC ................. 707/797, 798, 803, 805, 778, 956
See application file for complete search history.

(56) References Cited

U.S. PATENT DOCUMENTS

| | | | |
|---|---|---|---|
| 6,947,923 B2 * | 9/2005 | Cha et al. ............... | 707/999.003 |
| 7,822,774 B2 * | 10/2010 | Craswell et al. .............. | 707/791 |
| 2002/0140699 A1 * | 10/2002 | Miyadai ....................... | 345/440 |
| 2007/0094210 A1 * | 4/2007 | Craig et al. ..................... | 706/50 |
| 2007/0299837 A1 * | 12/2007 | Hou et al. ......................... | 707/4 |
| 2008/0033932 A1 * | 2/2008 | DeLong et al. .................... | 707/5 |
| 2008/0306934 A1 * | 12/2008 | Craswell et al. .................. | 707/5 |
| 2010/0082709 A1 * | 4/2010 | Yamamoto .................... | 707/812 |
| 2010/0106752 A1 * | 4/2010 | Eckardt et al. ................ | 707/805 |
| 2010/0228693 A1 * | 9/2010 | Dawson et al. ................ | 706/12 |

* cited by examiner

*Primary Examiner* — Phong Nguyen
(74) *Attorney, Agent, or Firm* — Horizon IP Pte Ltd

(57) ABSTRACT

Described herein is a technology for visualizing data. In accordance with some implementations, dimension metadata is automatically extracted from multiple documents. The extracted dimension metadata may be used to populate one or more relation dimensions. Based on the dimension metadata, one or more relations between the documents are determined along the one or more relation dimensions. A relation graph is presented to represent the documents interconnected by the one or more relations.

19 Claims, 13 Drawing Sheets

| RELATION DIMENSION | ATTRIBUTES |
|---|---|
| Report field name (DB field name) | field type, alias, database name, in use or not |
| Report filter (interested in which projects and team?) | filter field(DB field), filter value(formula or parameter) |
| Report parameter (DB parameter) | name, type, DB field, bstrParameterURI RDPromptingVarID |
| Report summary, running totaller | summary field name, (RDFieldDefinition) *Show different color if there is a potential parameter carry over exists |
| Report formula | Boolean dependsOnRecurringField; Boolean dependsOnSummaryField; Boolean dependsOnRunningTotalField; Boolean dependsOnPrintOrderField; Boolean dependsOnValueGridCompletion; Boolean dependsOnParameterField; Boolean dependsOnPreviousNext; Boolean dependsOnDateTime; Boolean dependsOnStringComparison; Boolean dependsOnDefaultAttribute; Boolean dependsOnCurrentFieldValue; Boolean dependsOnSharedVariables; Boolean dependsOnGlobalVariables; Boolean dependsOnTotalPageCount; Boolean dependsOnMemoField; Boolean dependsOnPrintTimeSpecialVarField; Boolean dependsOnGroupingLevel; Boolean dependsOnImpureFunction; Boolean dependsOnRandomFunction; Boolean dependsOnUserSpecialVar; |
| Report special fields | report author, modification date, data time, data date, etc. |
| Report object hyperlinks | hyperlink, data context |
| Report category | Financial report, bank account statement, invoice, etc. |
| Department, team of report users | Manufacturing, Quality Assurance, Call Centers, Sales, Web Marketing, IT, Human Resources, Product Management, Finance, Corporate Marketing, Corporate Travel, Technical Support, Training, Shipping |
| Most visited reports | - |
| Folder structure | - |
| BOE InfoObjects relations, (all the scheduled instances for a certain report) | - |
| Manually drag and drop to the relation graph in RIA | - |
| Tag dimension | User can enter tags for reports |
| User defined dimension | - |

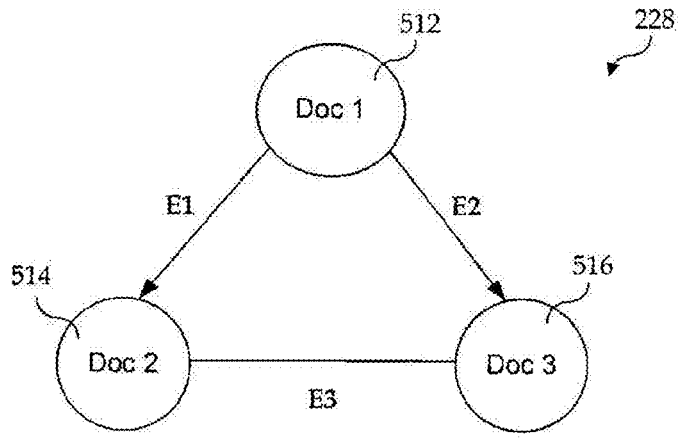

Fig. 5a

Document Relation Edge Table — 226

| Relation Edge ID | Report Source Node ID | Report Destination Node ID | Dimension ID | Relation ID |
|---|---|---|---|---|
| 1 | 1 | 2 | 1 | 1 |
| 2 | 1 | 3 | 1 | 1 |
| 3 | 2 | 3 | 2 | 2 |
| | | | | |

Document Dimension Table — 224

| Report ID | Report Name |
|---|---|
| 1 | All Projects Report |
| 2 | Project A Report |
| 3 | Project B Report |

Relation Table — 223

| Relation ID | Relation Type |
|---|---|
| 1 | Include |
| 2 | Equal |
| | |

Dimension Definition Table — 225

| Dimension ID | Dimension Name | Dimension Kind | Dimension Type |
|---|---|---|---|
| 1 | Project Name | DB Field | String |
| 2 | Team Name | Report Parameter | String |

Fig. 5b

```
Pseudo Code:

// Find all the reports whose in-use fields include in-use fields of report A

For (all report in reports){
        If(report.inUseFields.include(reportA.inUseFields){
                resultReports.add(report);

DIMENSION-BASED RELATION GRAPHING OF DOCUMENTS

TECHNICAL FIELD

The present disclosure relates generally to visualization of data, and more particularly, to dimension-based relation graphing of documents.

BACKGROUND

In the present business environment, corporations are demanding more real time information to make sound and time-critical business decisions. Business Intelligence (BI) applications have been used and applied to business data, such as sales revenue, costs, income, or other financial data to facilitate such business enterprise decision-making. BI applications provide various historical, current and predictive future views of business operations. One common function of BI applications is report generation. A report is typically a document containing information that is automatically retrieved from a data source (e.g., data warehouse) and formatted according to a predefined schema. Reports may be used to support the decision making process in many areas, such as sales, marketing, management, budgeting or forecasting.

In a large organization, however, many reports are generated every day and scattered across many departments in the organization. The volume of information contained in these reports is so high that the time necessary to properly deal with it is often unacceptable. In order for the reports to become actually usable knowledge, they need to be organized and easily accessible.

Conventional techniques developed for organizing reports do not provide a meaningful and organized view of the reports. Users are unable to easily visualize the relations between different isolated reports and navigate from report to report. In addition, conventional techniques provide very little intelligence in discovering or extracting relations between the reports. Such techniques also provide very limited customization capabilities to the user.

Accordingly, there is a need to provide an improved technology for organizing data.

SUMMARY

A technology for visualizing data is described herein. In accordance with some implementations, dimension metadata is automatically extracted from multiple documents. The extracted dimension metadata may be used to populate one or more relation dimensions. Based on the dimension metadata, one or more relations between the documents are determined along the one or more relation dimensions. A relation graph is presented to represent the documents interconnected by the one or more relations.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Some embodiments are illustrated in the accompanying figures, in which like reference numerals designate like parts, and wherein:

FIG. 3 shows an exemplary set of relation dimension definitions;

FIG. 5a shows an exemplary relation graph;

FIG. 5b shows an exemplary relation edge table and associated tables;

FIG. 6 illustrates exemplary pseudo code;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for facilitating data visualization is described herein. One aspect of the present framework advantageously presents the user with an organized, customizable and meaningful graphical representation of a large set of documents. The graphical representation allows the user to quickly find related documents and navigate from document to document. In some implementations, the graphical representation is dynamically generated while the user interactively navigates the relation graph. The graphical representation represents documents interconnected with document relations that are determined by the present framework. Such document relations may be automatically or semi-automatically determined with user-customized rules.

For purposes of illustration, the present framework is described in the context of reports. However, it should be noted that the present framework may also be applied to other non-report data or documents which contain information that is organized along one or more dimensions. For example, the present framework may be applied to non-report documents that are constructed without the automatic retrieval of information from a data repository. Examples of non-report documents include, for example, business application documents (e.g., word processor documents), web pages, or presentation slides.

The framework described herein may be implemented as a method, computer-controlled apparatus, a computer process, a computing system, or as an article of manufacture such as a computer-readable medium. These and various other features will be apparent from the following description.

Exemplary System

Figure 1:
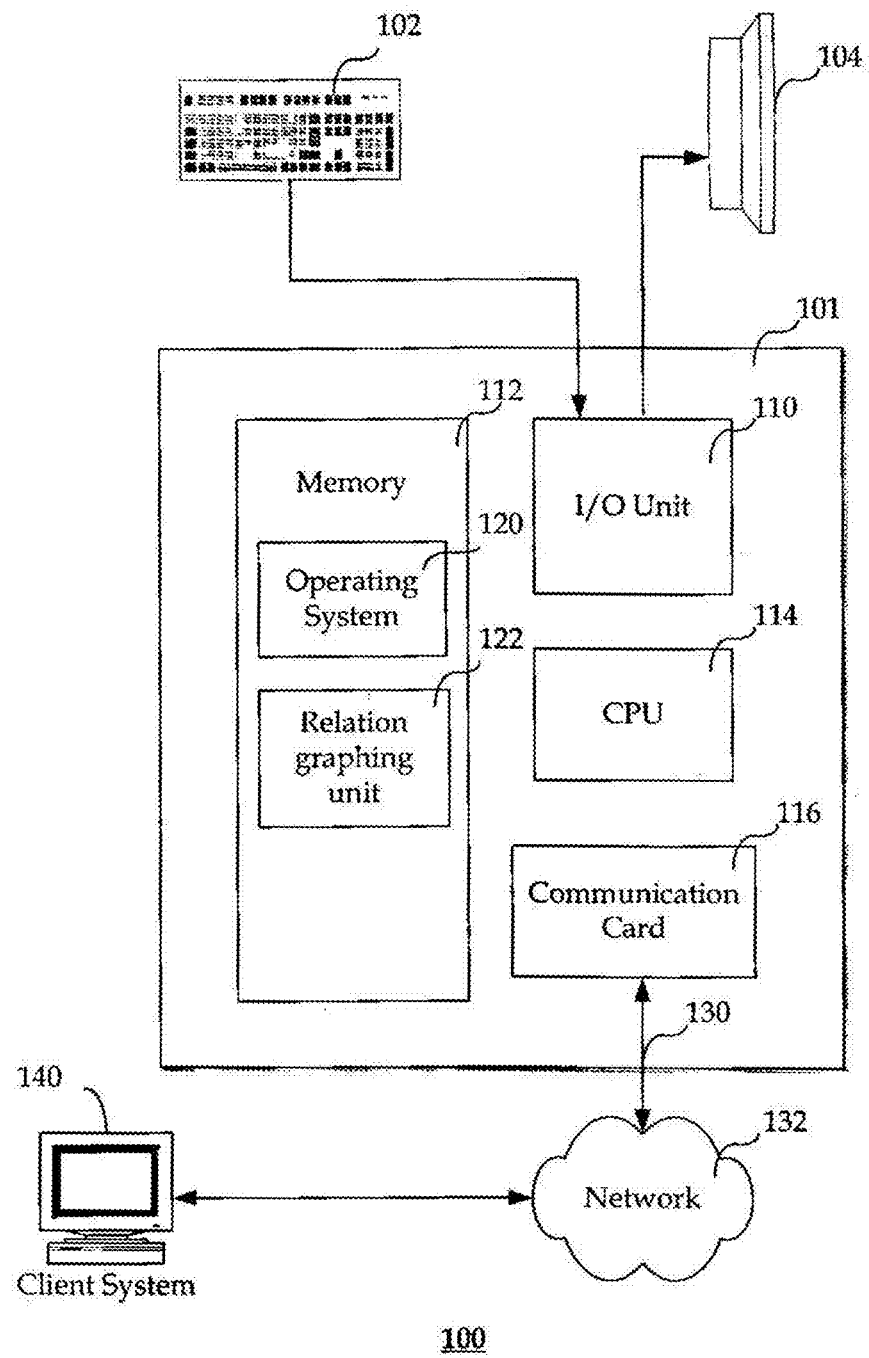
FIG. 1 is a block diagram illustrating an exemplary relation graphing system.

FIG. 1 is a block diagram illustrating an exemplary relation graphing system 100 that implements the framework described herein. The system 100 may include one or more computer systems 101, with FIG. 1 illustrating one computer system for purposes of illustration only.

Turning to the computer system 101 in more detail, it may include a central processing unit (CPU) 114, an input/output (I/O) unit 110, and a memory device 112. Memory device 112 may store machine-executable instructions, data, and various programs, such as an operating system 120 and a relation graphing unit 122 for implementing the techniques described herein, all of which may be processed by CPU 114. As such, the computer system 101 is a general-purpose computer system that becomes a specific purpose computer system when executing the machine-executable instructions. Alternatively, the relation graphing system described herein may be implemented as part of a software product, which is executed via the operating system 120. It should be noted that the relation graphing unit 122 may be hosted in whole or in part by different computer systems in some implementations. Thus, the relation graphing techniques described herein may occur locally on the computer system 101, or may occur in other computer systems and be reported to computer system 101.

Each computer program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Memory device 112 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks, magneto-optical disks, and Compact Disc Read-Only Memory (CD-ROM).

Computer system 101 may be coupled to an input device 102 (e.g., keyboard or mouse) and a display device 104 (e.g., monitor or screen). The display device 104 may be used to display the relation graph generated by the relation graphing unit 122. In addition, computer system 101 may also include a communications card or device 116 (e.g., a modem and/or a network adapter) for exchanging data with a network 132 using a communications link 130 (e.g., a telephone line, a wireless network link, a wired network link, or a cable network). Other support circuits, such as a cache, power supply, clock circuits and a communications bus, may also be included in computer system 101. In addition, any of the foregoing may be supplemented by, or incorporated in, application-specific integrated circuits.

Computer system 101 may operate in a networked environment using logical connections to one or more remote client systems 140 over one or more intermediate networks 132. These networks 132 generally represent any protocols, adapters, components, and other general infrastructure associated with wired and/or wireless communications networks. Such networks 132 may be global, regional, local, and/or personal in scope and nature, as appropriate in different implementations.

The client system 140 may be a personal computer, a mobile device, a personal digital assistant (PDA), a server, a router, a network PC, a peer device or other common network node, and typically includes many or all of the elements described above relative to computer system 101. For example, the client system 140 may include one or more input devices (not shown) for receiving input from users requesting and navigating through the various reports from the computer system 101. In addition, the client system 140 may further include one or more display devices (not shown) for displaying the relation graph generated by the relation graphing unit 122.

The client system 140 may also include one or more instances of computer readable storage media or memory devices (not shown). The computer readable storage media may include a client application suitable for interacting with relation graphing unit 122 over the network 132. The client application may be an internet browser, a thin client or any other suitable applications. Examples of such interactions include requests for reports or relation graphs of such reports. In turn, the client application may forward these requests to the computer system 101 for execution.

Figure 2:
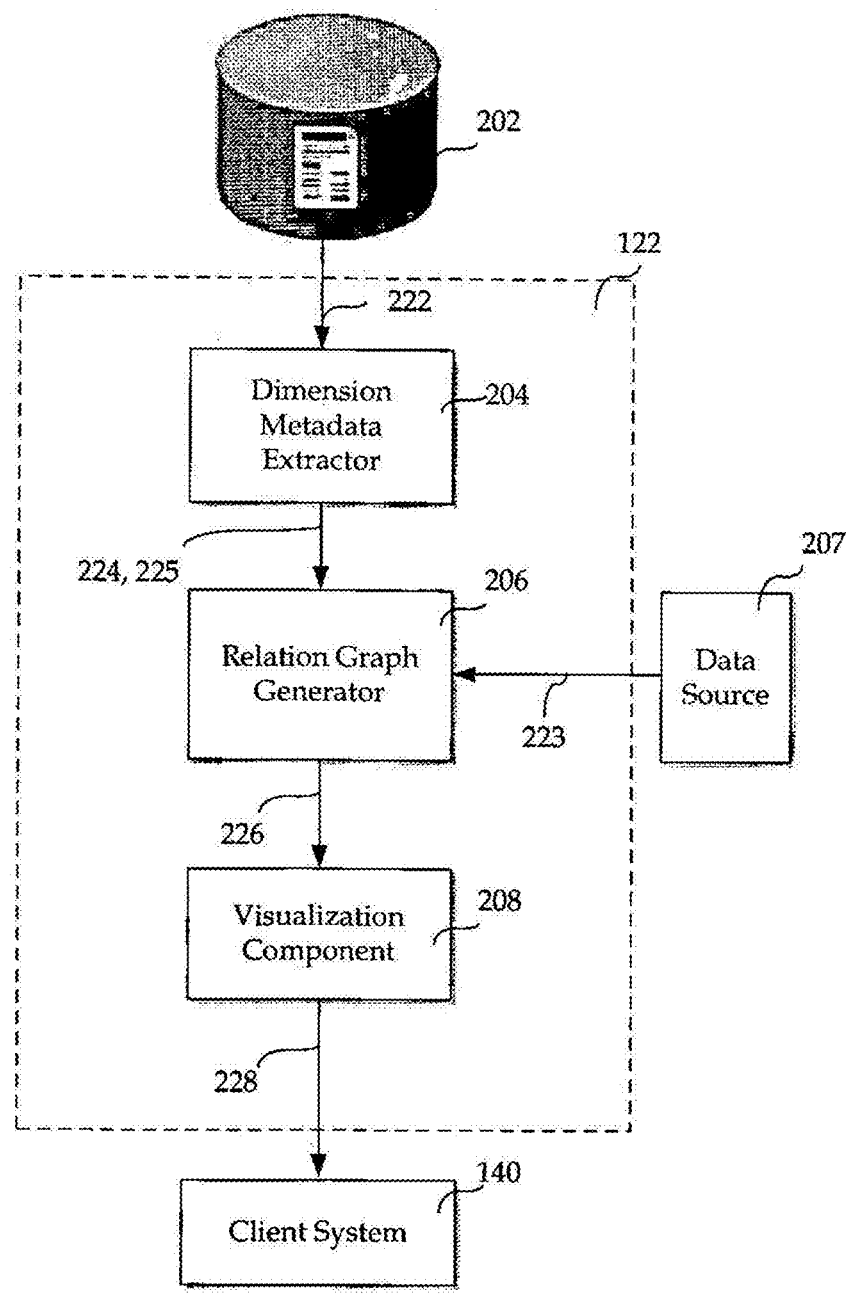
FIG. 2 illustrates components of a relation graphing unit.

FIG. 2 illustrates the components of the relation graphing unit 122. In one implementation, the relation graphing unit 122 comprises a dimension metadata extractor 204, a relation graph generator 206 and a visualization component 208. It should be noted that one or more of these components may be hosted by different computer systems in some implementations.

In one implementation, the dimension metadata extractor 204 is operable to retrieve one or more documents (e.g., reports) 222 from a data repository 202. The data repository 202 may be stored in the memory device 112 of computer system 101, described with reference to FIG. 1. Alternatively, the data repository 202 may be stored in a remote computer system (not shown) communicatively coupled to the computer system 101 via network 132. The data repository 202 may comprise executable instructions or a database management system to access one or more documents. In addition, the data repository 202 may further comprise a file directory for storing the one or more documents or reports.

In some implementations, the documents are generated by an optional Business Intelligence (BI) module residing in the computer system 101 or obtained from another source. The documents may include, but are not limited to, financial reports, bank account statements, invoices, regulatory reports, mailing and CD labels, barcodes, name tags, calendars, project status reports, transcripts, phone lists, expense listings, call volume reports, volume status reports, mail merge letters, employee profile reports, police reports, timesheets, hotel bills, financial statements, operating statements, activity reports, catalogs, shipping manifests, top 5 sales order reports, network utilization reports, web traffic summaries, etc. It should be appreciated that the present framework is also applicable to other types of reports or non-report documents.

At an initial set up time, during the configuration of the system 100, relation dimensions may be defined by the user via, for example, a user interface.

A "relation dimension" represents a property or characteristic about a relation between the documents (or reports). A relation exists between two documents when at least one dimension of a document shares a relation with a dimension of the other document. FIG. 3 shows an exemplary set 301 of pre-defined relation dimensions. As shown, each relation dimension is associated with a set of attributes. Exemplary relation dimensions include, but are not limited to, report field name, report filter, report parameter, report summary, report formula, report special field, report object hyperlink, report category, department, team of report user, most visited report, folder structure, Business Objects Enterprise (BOE) InfoObjects relations, dimension defined by manually dragging and dropping to the relation graph via a Rich Internet Application (RIA), tag dimension, any user-defined dimension, and so forth. It should be appreciated that these relation dimensions are provided merely for illustration purposes, and should not be construed to limit the possible implementations of the present framework. In addition, a user may add, replace, or remove definitions of relation dimensions according to the needs of a particular application, thereby advantageously providing greater customization capabilities.

Referring back to FIG. 2, the dimension metadata extractor 204 extracts dimension metadata from the documents to populate the pre-defined relation dimensions. Dimension metadata refers to information about the documents, and may be data that is actually displayed in the document or hidden from the user. In addition, the dimension metadata may be data values as they appear in a data source or calculated from original data values. Dimension metadata includes, for example, information about the author of the document, transformation histories, references to one or more data sources, etc. For example, a report generated by an employee may contain metadata describing the employee's name, department and telephone number. A project report may contain metadata describing the project name, the project owner, the start date of the project and the budget allocated to the project. Other types of dimension metadata may also be extracted from the documents.

Figures 4A, 4B:
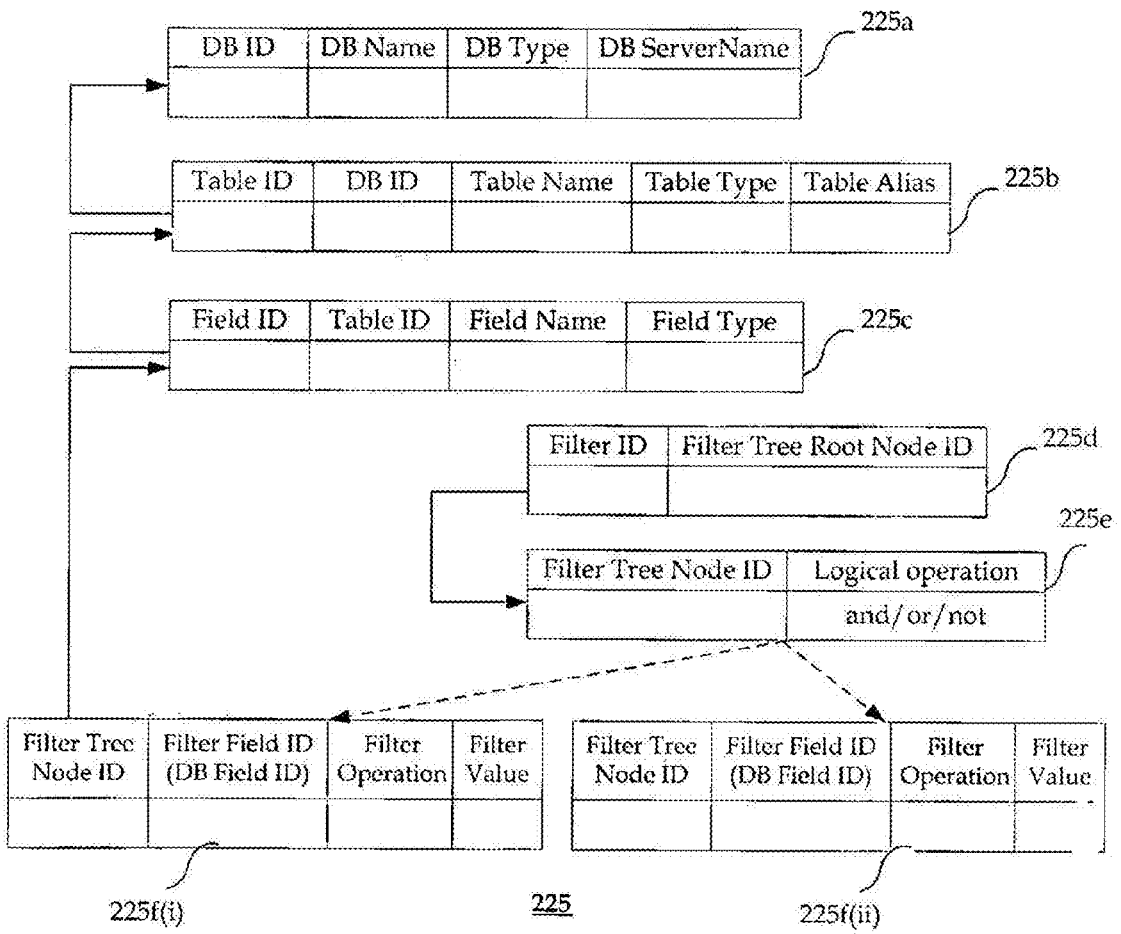
FIG. 4a shows an exemplary document dimension table.
FIG. 4b shows exemplary dimension definition tables.

FIG. 4a illustrates an exemplary document dimension table 224 and FIG. 4b shows exemplary dimension definition tables 225a-e which may be used to store the extracted dimension metadata. Other data structures or methods of organizing document dimension metadata are also useful. User-defined relation dimensions, such as those described by the exemplary set 301 previously discussed with reference to FIG. 3, may also be used to add or define columns (or tables) in the dimension definition tables 225a-e.

The document dimension table 224 and dimension definition tables 225a-e may be regarded as fact tables that contain the metrics or facts about the documents (or reports). In some implementations, a given record (or row) 402 of the document dimension table 224 corresponds to a particular document (e.g., employee report or project report). Each record may include identifiers (IDs) that link to a dimension definition table 225 that further defines the dimension associated with the documents. Exemplary identifiers (IDs) include, but are not limited to, a document ID, a database (DB) ID, a table ID, a field ID or a filter ID.

A dimension definition table (or dimension table) 225 comprises a set of attribute values along a particular dimension. For example, dimension definition table 225a corresponds to the database (DB) dimension, table 225b corresponds to the table dimension, table 225c corresponds to the field dimension and table 225d-f corresponds to the filter dimension. The dimension metadata extractor 204 may generate the dimension definition tables 225a-f by inserting a new record into the appropriate dimension definition table 225 whenever a new set of attributes is extracted from the documents. The value of an attribute may be another identifier, which links to a record in another dimension definition table 225. For example, the filter tree dimension table 225d includes an attribute "Filter Tree Root Node ID," which points to a record in the filter tree node dimension definition table 225e. The filter tree node dimension definition table 225e defines the non-terminal nodes of the filter tree. A node in the filter tree node dimension definition table 225e may link to primitive (or terminal) nodes defined by primitive node dimension definition tables 225f(i)-(ii).

Figure 4C:
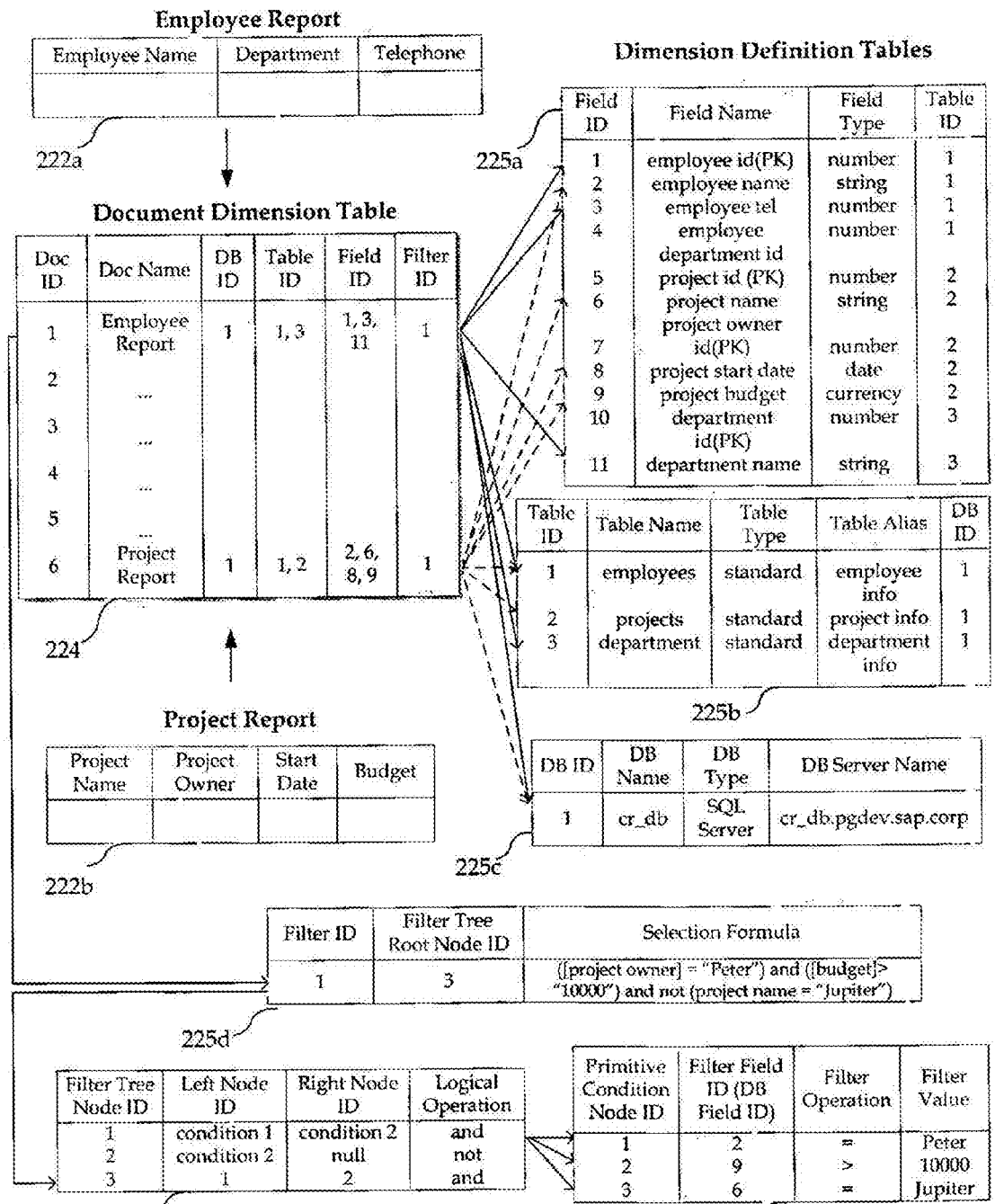
FIG. 4c shows an exemplary document dimension table, exemplary reports and exemplary dimension definition tables populated with dimension metadata.

FIG. 4c illustrates how an exemplary document dimension table 224 may be populated with exemplary dimension metadata extracted from an employee report 222a and a project report 222b. As shown, the first record (or row) of the document dimension table 224 corresponds to the employee report 222a, and the sixth record corresponds to the project report 222b. Referring to the first record (Doc ID=1), for example, the "Field ID" dimension stores the values 1, 3, and 11, which link to the first, third and eleventh records of the field dimension definition table 225a.

As discussed previously, a given record (or row) in the field dimension definition table 225 stores a set of attribute values. The attribute value may be an identifier that links to another dimension definition table. Referring to the filter dimension definition table 225d, for example, the record with "Filter ID=1" stores the value "3" for the "Filter Tree Root Node ID" attribute, which links to the third record in the filter tree dimension definition table 225e. It is to be appreciated that the exemplary tables shown in FIGS. 4a-c and 5 may be structured in any number of ways or include any other dimensions, attributes or attribute values, with the examples in this description being provided only to facilitate discussion, but not to limit possible implementations.

Turning back to FIG. 2, the relation graph generator 206 receives the document dimension table 224 and one or more dimension definition tables 225 from the dimension metadata extractor 204. The relation graph generator 206 may be configured to automatically or semi-automatically determine, based on the extracted dimension metadata, one or more relations between the documents along the pre-defined relation dimensions. The relations may be stored in a relation edge table 226, which is passed to the visualization component 208 to render a relation graph 228.

FIG. 5a shows an exemplary relation graph 228. The nodes (512, 514, 516) represent documents (or reports) and the edges (E1, E2, E3) represent dimension-based relations between the documents. The edges may either be directed (E1, E2) or non-directed (E3). A non-directed edge represents an "equal" relation, while a directed edge represents, for example, an "include" relation or other "non-equal" relations. It is understood that other types of relations may also be possible. More details of the relation graph 228 will be provided later.

FIG. 5b shows a report relation edge table 226 that may be used to build the relation graph 228. The report relation edge table 226 links to a document dimension table 224, a relation table 223, and a dimension definition table 225. Each record (or row) 510 of the relation edge table 226 cross-references a source report and a destination report which share a relation along a particular dimension. The source and destination reports may be defined by the document dimension table 224. The relation is defined by the relation table 223, while the dimension is defined by the dimension definition table 225. The document dimension table 224 and dimension definition table 225 may be generated as discussed previously. It is to be understood that the tables shown in FIG. 5b are merely exemplary, and other types of tables or non-table data structures may also be used to define the relation graph 228. For example, FIG. 4c shows other examples of a document dimension table 224 and dimension definition tables 225a-f.

The relation table 223 defines the general types of relations (e.g., include, equal, child-parent, etc.) that may exist between the reports. Referring back to FIG. 2, the general types of relations are defined by a set of one or more relation descriptions. The set of relation descriptions 223 may be pre-defined and retrieved from, for example a data source 207. The data source 207 may reside locally in the memory device 112 or another remote system. Alternatively, the relation descriptions 223 may be defined by a user. For example, a user may define the relation descriptions 223 via a user interface while interactively viewing the relation graph 228 on a display device. The user may also define the relation descriptions 223 via an application programming interface (API). The API may be implemented, for example, as part of a software development kit (SDK), application, library or operating system.

The relations between the documents may be a set relation (e.g., $\in, =, \subset, \supset, \subseteq, \supseteq$), a hierarchical relation (e.g., child-parent), a numerical relation, or any other type of relation. Regarding set relations, for example, a dimension of a document may be regarded as an "element" in a set. Thus, a set comprises a collection of relation dimensions associated with the document.

Relations may be classified as semantic relations or context relations. A semantic relation is based on the meaning of the document dimension metadata, and may be derived from the presentation layer. A context relation, on the other hand, is based on surrounding information that determines or clarifies the meaning of the report dimension metadata. Context relations may be derived from parameters, filter fields, etc., associated with the dimension metadata.

In addition, a relation may also be determined along a particular dimension. Relation dimensions are defined in, for example, a dimension definition table 225, such as previously discussed with respect to FIGS. 4b-c and 5b. Exemplary types of dimension-based relations include, but are not limited to, database (DB) field relations, report filter relations (e.g., filter field relations, filter set relations, filter semantic relations, etc.), report parameter relations (e.g., normal or DB parameters relations), report summary relations (e.g., equality relations, hierarchical relations, time period relations, etc.), report formula relations, report special field relations, report summary information relations, object hyperlink relations, and/or non-report object relations (e.g., based on names of persons who viewed or scheduled the report).

According to some implementations, the relation graph generator 206 is configured to determine one or more database (DB) field relations between the documents. A DB field relation is determined by identifying a relation (e.g., set relations or hierarchical relations) between the documents via a DB field set. A DB field set comprises one or more database elements. The database element may be a DB field, a table, a database or any named database unit. When a valid relation between a pair of documents is found via the DB field set, the relation graph generator 206 may, for example, populate the relation edge graph 226 with the identifiers (IDs) of the pair of documents, as shown in FIG. 5b.

To derive a DB field relation between the documents, the DB field set is first defined. Relations may then be determined between documents that use at least one database element in the defined database field set. In some implementations, a DB field set corresponds to one or more particular documents. Alternatively, the DB field set comprises custom-selected database elements. The DB field set may be automatically or semi-automatically (i.e. with user-assistance) defined by the relation graph generator 206, or manually defined by the user. In some implementations, the relation graph generator 206 automatically defines the DB field set by parsing the dimension metadata in document dimension table 224 and dimension definition tables 225, and extracting all database elements that are in-use by one or more particular documents. Alternatively, the user may directly select the database elements to form the DB field set.

In some implementations, the DB field relation is a set relation. Set relations include, for example, "equals," "includes," "is subset of," etc. FIG. 6 illustrates an exemplary pseudo code 602 for searching for reports that have an "includes" set relation with a particular report A. The pseudo code 602, when executed by a processor (e.g., CPU 114), causes the processor to find any report that uses all the DB fields from report A's database field set. It is understood that such pseudo code is merely provided to illustrate an example of establishing a set relation, and should not be construed to limit possible implementations of the present framework.

In some implementations, the DB field relation is a hierarchical relation. A hierarchical DB field relation is determined by identifying a relation between the documents via a hierarchy. The hierarchy may be a DB hierarchy or a semantic hierarchy. The hierarchy may be automatically or semi-automatically (i.e. with user-assistance) defined by the relation graph generator 206, or manually defined by the user. A DB hierarchy is determined by the taxonomic arrangement of database elements (e.g., DB field, table, database). For example, a Database dimension is at a higher level than a Table dimension, which is at a higher level than a Field dimension. Exemplary DB, Table and Field dimensions are defined in tables 225a, 225b and 225c as depicted in FIG. 4c. A semantic hierarchy, on the other hand, is determined by the taxonomic arrangement of semantic propositions. For example, an employee field dimension may be a child node of a team field dimension, which is a child node of a country field dimension.

Once a hierarchy of dimensions is defined, one or more relations may be determined for documents that use at least one dimension in the hierarchy. The relation may be a database hierarchical relation or a semantic hierarchical relation, depending on the type of hierarchy the relation is based on. Various types of relations (e.g., child-of, parent-of, sibling, etc.) may be determined based on the hierarchy. For example, if documents A and B use child dimensions (e.g., DB Fields) connected via a common parent dimension (e.g., Table), then documents A and B share a "sibling relation." More particularly, and by way of example, if document A uses a first Field in a given Table, and document B uses a second Field in the same Table, then documents A and B are determined to share a DB field relation via the Table, even though the first and second Fields may be different.

According to some implementations, the relation graph generator 206 is configured to determine one or more filter relations. A filter relation is a contextual relationship that is derived from the filter dimensions of the documents. A filter is an expression that limits or defines the parameters that are used in generating a sub-set of records presented in a document. A filter may be in the form of a filter (or syntax) tree. FIG. 4c illustrates tables 225d-f that define a filter tree.

Figure 7:
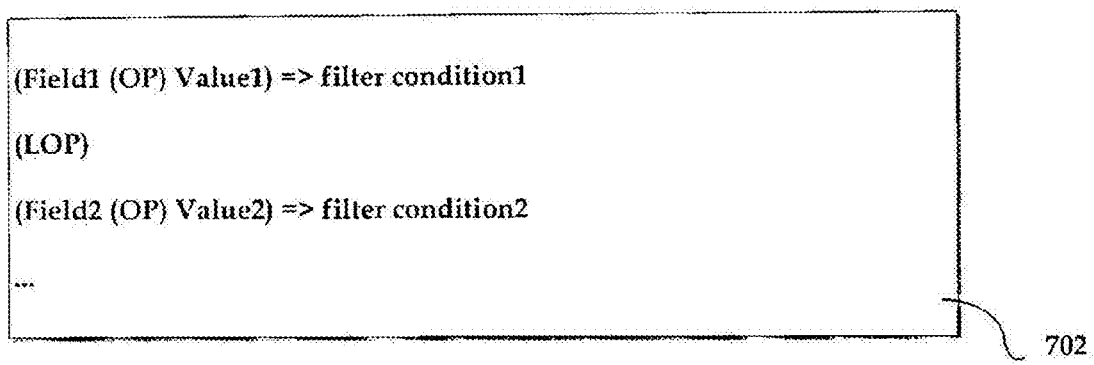
FIG. 7 shows an exemplary generic filter.

FIG. 7 shows an example of a generic filter 702. As illustrated, a filter 702 may include a condition (e.g., filter condition1) formed by applying a filter operation (e.g., =, >, <) between a filter field (e.g., Field1) and a filter value (e.g., Value1). Logical operations (e.g., AND, OR, NOT) may further be applied to multiple filter conditions (e.g., filter condition1 and filter condition2) to form the result sub-set of records. The filter 702 may be defined by a user via, for example, a user interface. In some implementations, the user interface presents a selection wizard for receiving user selections. For example, the user may use the selection wizard to customize the filter while viewing or designing a report.

A filter relation may be a filter field relation, a filter set relation or a filter semantic relation. A filter field relation is determined by comparing the filter fields of the documents. A filter field may be a database field or a formula field. Thus, a filter field relation may also be defined by the relation definitions of DB fields and formula fields. One example of a filter field relation is an equality relation. Documents with common filter fields are determined to share an equality relation along the filter field relation dimension.

As for filter set relations, they may be determined by identifying any set relations between result sub-sets of database fields. A result sub-set is generated by applying filter fields and their associated values to the fields in a database. The values of filter fields comprise, for example, filter conditions and logical operations (e.g., AND, NOT, OR, etc.). A filter condition defines a condition subset of the universal set of database fields, determined by applying a filter operation between a filter field and a filter value. One or more filter conditions may be associated with a document to generate one or more condition subsets. The result subset of a document may be formed by applying one or more logical operations to the condition subsets. Depending on which logical operations (if any) are used, the result subset may be defined by the union or intersection of one or more condition subsets.

Given the result subsets corresponding to various documents, one or more filter set relations between the documents may be determined. The filter set relation comprises, for example, an equality relation (=), a "lie-in" relation ($\subset, \subseteq$), or an "include" relation ($\supset, \supseteq$). FIGS. 8a-d and 9 illustrate various examples of how set relations may be derived along the filter dimension. It should be noted, however, that these examples are provided merely for illustration purposes only, and should not be construed to limit possible implementations of the present framework.

Figure 8A:
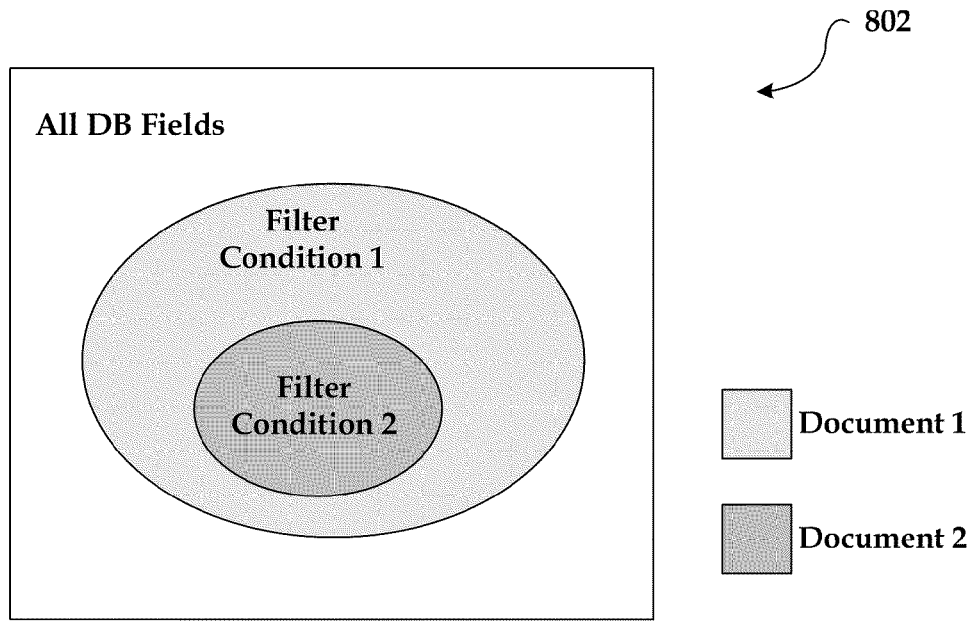
FIGS. 8a-d and 9 are exemplary Euler diagrams.

FIG. 8a is an Euler diagram 802 showing document 1 and document 2 having one filter condition each. The result subset of document 1 is equal to the filter condition 1 set and the result subset of document 2 is equal to the filter condition 2 set, since no logical operation is applied to the filter conditions. Document 2 may be determined to be a filter subset of document 1, since the result subset of document 2 is contained inside the result subset of document 1. In other words, the filter relation between document 1 and document 2 is: document 1 document 2.

Figure 8B:
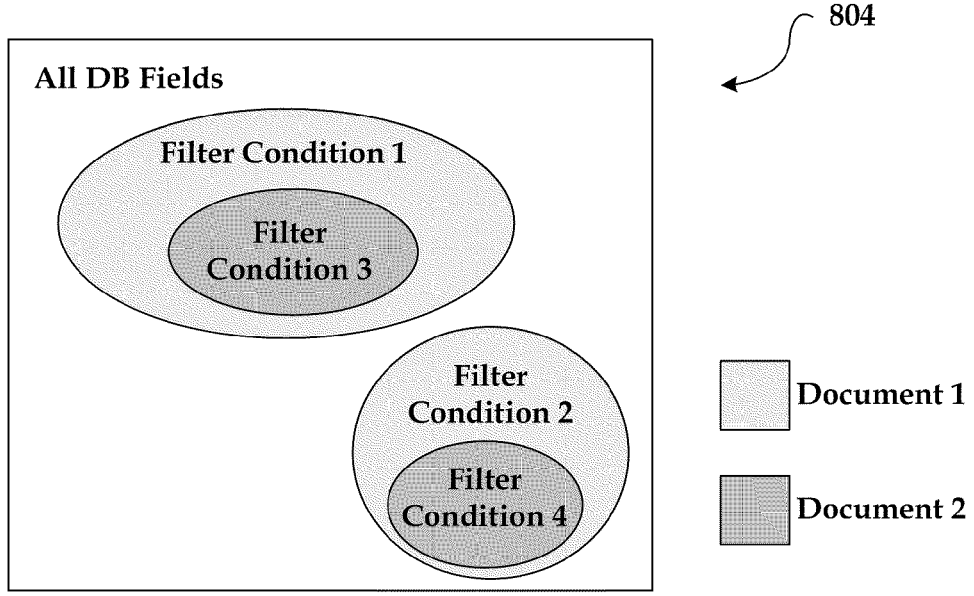

FIG. 8b is an Euler diagram 804 where documents 1 and 2 have two filter conditions each. A logical "OR" operation is applied to the filter conditions of each document. i.e. (filter condition 1 OR filter condition 2); (filter condition 3 OR filter condition 4). In such scenario, the result subset of document 1 is the union set of filter conditions 1 and 2, while the result subset of document 2 is the union set of filter conditions 3 and 4. Since the result subset of document 2 is contained in the result subset of document 1, the filter relation between document 1 and document 2 is: document 1 $\supset$ document 2.

Figure 8C:
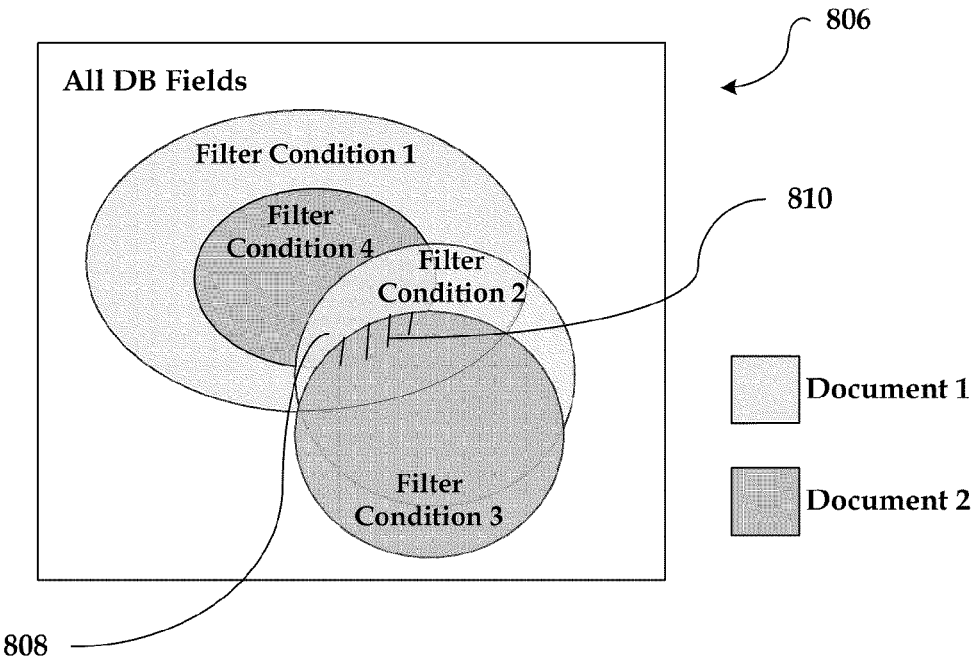

In FIG. 8c, the Euler diagram 806 illustrates a similar case where documents 1 and 2 have two filter conditions each. However, in this exemplary case, a logical "AND" operation is applied to the filter conditions of each document. i.e. (filter condition 1 AND filter condition 2); (filter condition 3 AND filter condition 4). The result subset 808 of the first document is the intersection subset of the filter conditions 1 and 2. The result subset 810 of the second document is the intersection subset of the filter conditions 3 and 4. Since the result subset 810 of document 2 is a subset of the result subset 808 of document 1, the filter relation between document 1 and document 2 is: document 1 $\supset$ document 2.

Figure 8D:
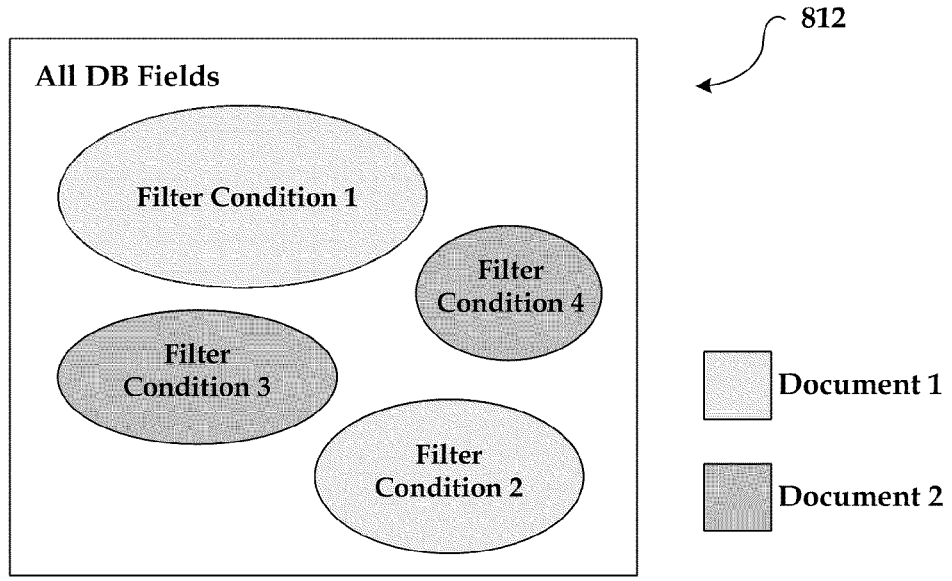

FIG. 8d is an Euler diagram 812 where the result subsets of documents 1 and 2 do not overlap. In such case, there is no filter "include" or "lie in" relations between documents 1 and 2. However, other types of set relations may be derived between the documents. The types of set relations to be derived may be selected according to the application or user's needs.

Figure 9:
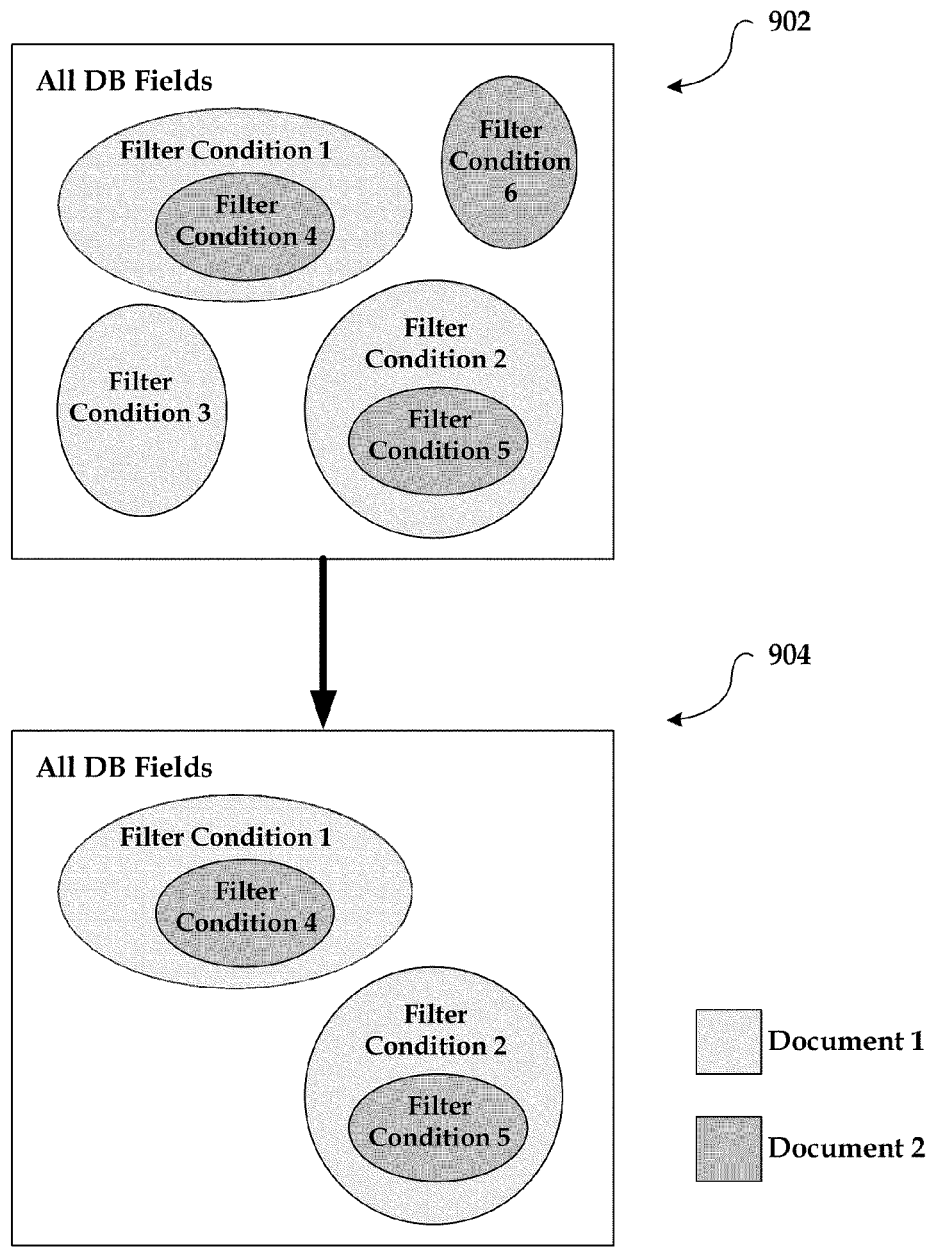

In some implementations, only the "include" and "lie in" relations between documents are stored. For example, FIG. 9 is an Euler diagram 902 depicting documents 1 and 2 with three filter conditions each (filter conditions 1, 2, 3 and filter conditions 4, 5, 6 respectively). Since filter conditions 3 and 6 do not give rise to any "include" or "lie in" relations between the documents, the scenario may be simplified as illustrated by Euler diagram 904. As shown, filter conditions 3 and 6 are removed. The set relation (i.e. document 1 $\supset$ document 2) between documents 1 and 2 is determined based on filter conditions 1, 2, 4 and 5.

Another type of filter relations that may be derived along the filter dimension are filter semantic relations. A filter semantic relation is a relationship that is derived from the semantic relationship between the filters. Since filter semantic relations are difficult to identify by analyzing the filters as condition sets (as described previously with respect to FIGS. 8a-d and 9), a user may be required to assist in the determination process to recognize such semantic relations.

Figure 10A:
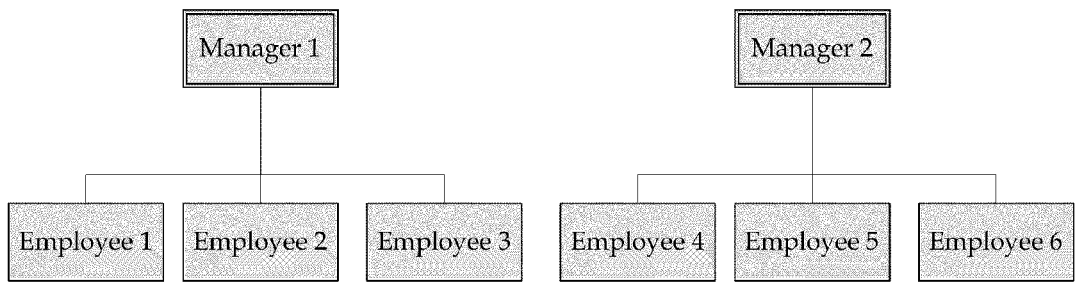
FIG. 10a shows an exemplary organizational chart.
Figure 10B:
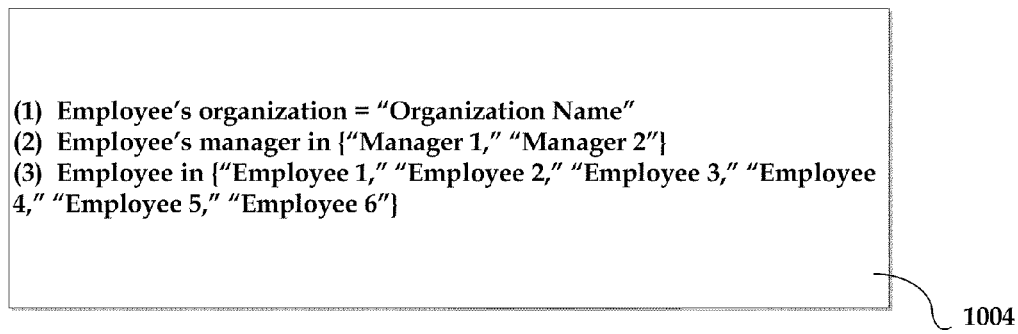
FIG. 10b illustrates exemplary filters.

FIG. 10a illustrates an exemplary organizational chart 1001 from which filter semantic relations between documents may be derived. FIG. 10b shows exemplary filters 1004 that may be used to represent the organizational chart 1001. It should be noted, however, that these filters 1004 are merely for illustration purposes only, and other types of filters may also be used. Documents that use any one of the filters 1004 return the same records, assuming that the information maintained in the database is up-to-date and accurate. For example, if a user specifies any of these filters 1004 to filter "employees" for given documents, the relation graph generator 206 determines the filter semantic relation "equal" between these given documents. Other types of filter semantic relations may also be determined.

In some implementations, the relation graph generator 206 automatically derives the filter semantic relation without the user's intervention. In particular, the hierarchical information may be stored in, for example, the memory device 112. By looking up the hierarchical information, the relation graph generator 206 may derive filter semantic relations between documents. For example, a document with a first filter specifying employee in {"employee 1," "employee 2," "employee 3"} is "equal" to a document with a second filter specifying employee's manager="manager 1." This is because the first and second filters select the same entity "employees" from different hierarchical levels. In particular, the first filter selects all the child nodes by directly providing the names of all the employees, while the second filter selects the child nodes by providing the name of the parent manager node.

One major advantage of providing filter semantic relations is that it enables users to consolidate and unify different filters. For example, when manager 2 has a new employee 7, user A may update filter (3) to include "employee 7" in the filter values. However, this organizational change may not have been reflected in the database yet, and filters (1) and (2) may not be accurate anymore. In such case, when user B uses the document with filter (1), user B may be notified by the computer system 101 that one of the filters that have the same semantic relations has been updated. Upon receiving such notification, user B may choose to continue using filter (1) or switch to use filter (3).

In some implementations, only one of the filters with the same semantic relation is actively used. The other filters may be deprecated over time if they cannot adapt to informational changes. For example, if the organizational information is updated daily, filter (1) or (2) may survive as they are easy to maintain. Alternatively, filter (3) may survive if it has the highest probability of providing the most pertinent and up-to-date information.

The relation graph generator 206 may further be configured to derive one or more parameter relations. A parameter is typically input by the user who executes or generates the document. A parameter relation is a relationship between documents that is derived by identifying a valid relationship between parameters associated with the documents. Parameters may be normal parameters or database parameters. The type of parameters may be, for example, a string, a Boolean operator, a number, a currency type, a date, a time, etc.

A normal parameter comprises static textual information. Two parameters have an equality relation if the names and types of the parameters' definitions are the same. In some instances, the names of two parameters may have the same meaning but different appearances. The difference in appearance may be due to different languages (e.g., English and Chinese). To accommodate different languages, the names of the parameters may be pre-processed to extract and identify named entities. In some embodiments, third party text analysis tools, such as SAP BusinessObjects Text Analysis by SAP of Walldorf, Germany, may be used to supplement this functionality.

A database parameter comprises a selection formula or a DB stored procedure parameter. An equality relation between two selection formulae may be determined if the corresponding filter values match. As for DB stored procedure parameters, an equality relation between two parameters is established if the stored procedures are the same.

In some implementations, the database parameters comprise a set of dynamic cascading parameters (DCPs). DCPs are a set of related parameters defined such that the value for one parameter depends on a value chosen for another parameter. For example, Parameter 1→Parameter 2→Parameter 3 means that the first parameter (e.g., Parameter 1) is independent, while the value for the second parameter (Parameter 2) is dependent on the value for the first parameter (Parameter 1), and the value for the third parameter (Parameter 3) is dependent on the value for the second parameter (Parameter 2). For DCPs, equality and set relations may be valid. The relation graph generator 206 may derive an equality relation between documents 1 and 2 if the parameters of document 1 are the same as the parameters of document 2. In addition, if document 1 has one or more lower level parameters of the DCP of document 2, document 1 has a "lie in" relation with document 2.

The relation graph generator 206 may further be operable to determine one or more summary relations. A summary relation is a relation between documents that is determined by identifying a valid relationship between summaries of the documents. A summary refers to pre-computed information used for speeding up query processing. Such summary information typically stores aggregated information and is created by applying an aggregate function, such as SUM, COUNT or AVERAGE, to values contained in base tables from which data was originally gathered and derived. One exemplary form of a summary is "SUM (field) on condition (condition)." E.g. "SUM (sales) by country." Other examples of summaries include, but are not limited to, counts of minimum values, maximum values and average calculations.

A summary relation may include an equality relation, a hierarchical relation or a time period relation.

An equality relation between documents may be determined by comparing the contents of summaries associated with the documents. In one implementation, if the summaries of the first and second documents include a common field, then the first and second documents have an equality summary relation. Alternatively, a more stringent comparison may be performed by requiring the same aggregate function (e.g., SUM, AVERAGE) or the same condition in the summaries for an equality relation to exist.

A hierarchical relation between documents may be determined by comparing the fields used in the summaries and the fields "in-use" in the documents. More particularly, if the summary of the first document includes a field that is "in-use" in a second document, the first document is regarded as the parent of the second document.

A time period relation may be determined by analyzing the document selection formula to determine the time period over which the summary is generated. If the first document's summary is generated over a longer time period than the second document's summary, then the first document is regarded as the parent of the second document. For example, a document with a summary that spans across one year is the parent of a document with a summary that spans across a quarter, which is a parent of a document with a summary that spans across a month, which is a parent of a document with a summary that spans across a week and so forth.

The relation graph generator 206 may further be configured to determine one or more formula relations. A formula describes a calculation that is performed on the data to generate the document. In one implementation, an equality relation is derived between documents that use the same formula. Other types of relations may also be derived. The formula relations may also be defined by the user via, for example, a user interface.

The relation graph generator 206 may further be configured to determine one or more special field relations. Special fields allow different document properties (e.g., author name, modification date, content locale, etc.) or print states (e.g., page number, total page count) to be displayed in a document. An equality relation may be identified between documents with one or more common special fields. For example, documents with the same "author name" may share an equality relation. In another example, documents which are updated or refreshed in a given period of time (e.g., last 3 days) may be identified by an equality relation based on a common "modification date." In yet another example, documents which have been viewed by a certain user or group of users may be connected by an equality relation. Other types of document special field relations may also be defined.

The relation graph generator 206 is also configurable to determine summary information relations between documents. This may be achieved by identifying relations between their summary information. Examples of summary information include "Title," "Created Date," etc. Depending on the type of summary information, various types of relations (e.g., "equality," greater than," "less than," "earlier than," "later than," etc.) may be determined.

Another type of relation between documents that the relation graph generator 206 may determine is an object hyperlink relation. A hyperlink is a reference to another document that the user can directly follow or that is followed automatically. If a first document has an object hyperlink to a second document, a directed edge from the first document to the second document is created in the object hyperlink relation graph.

Yet another type of relation that the relation graph generator 206 may derive is a non-report object relation. Examples of non-report objects include dimensions such as "Report category," "Department," "Most visited reports," "Folder structures," "Manually drag and drop to the relation graph in RIA," "tag dimension," "User defined dimensions," and so forth. Reports with common non-report objects may be determined to share an equality relation. Other types of relations, such as hierarchical relations (e.g., "belong-to", "department and sub-department," "folder-file"), may also be determined. The relations may also be defined by the user or pre-defined by a business intelligence software application.

Turning back to FIG. 2, once the relation edge table 226 is generated, they are passed to the visualization component 208. The visualization component 208 renders the relation graph 228, which is a visual representation of the relation edge table 226. The relation graph 228 may be presented at a display device and manipulated by a user at, for example, client system 140. The relation graph 228 may serve as a navigation aid to the user. In some implementations, the visualization component 208 renders the relation graph 228 dynamically while the user navigates through the documents. Alternatively, the visualization component 208 may statically pre-compute or render the relation graph 228 prior to user manipulation.

Figure 11:
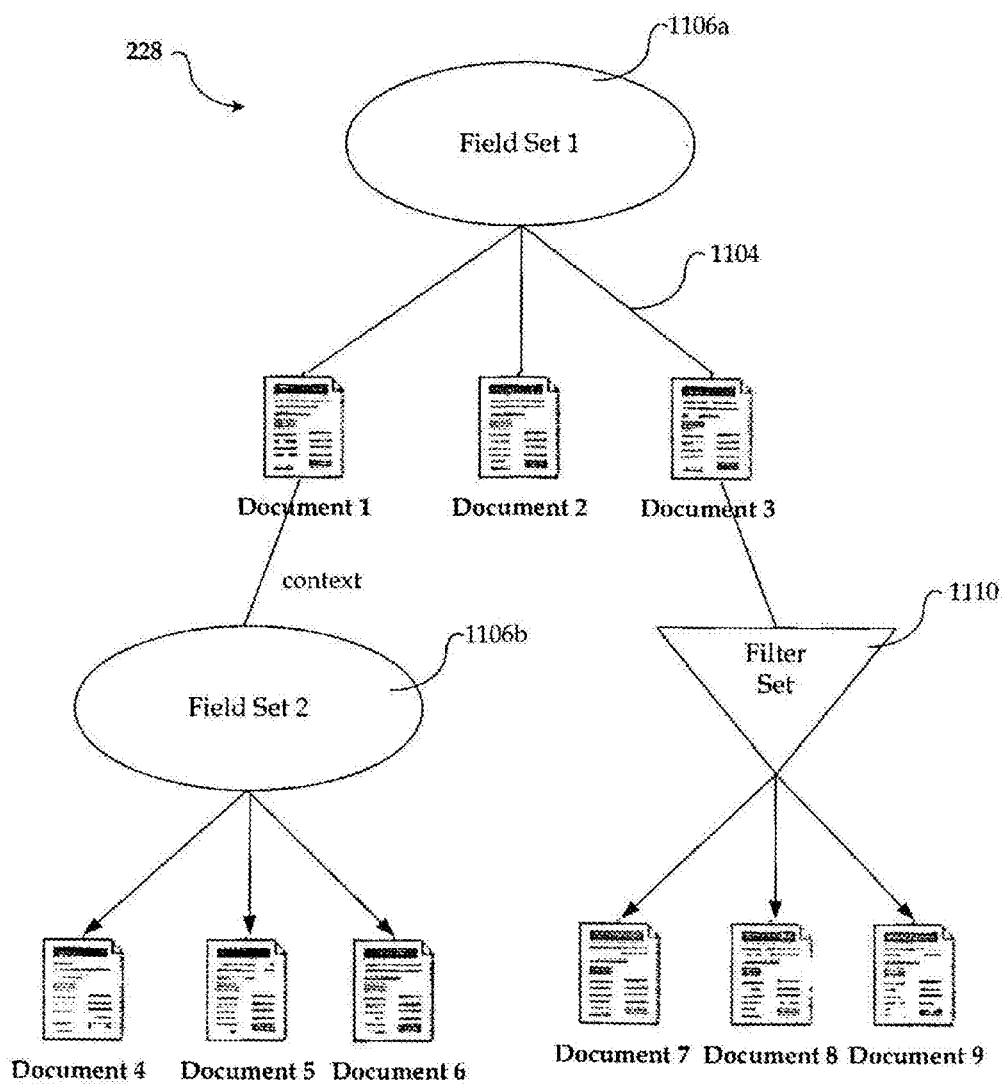
FIG. 11 shows an exemplary relation graph.

FIG. 11 shows an exemplary relation graph 228. The relation graph 228 represents documents interconnected by dimension-based relations. As discussed previously, the edges 1104 in the relation graph 228 may be directed or undirected. Undirected edges may be used to depict the equality relation. Directed edges may be used to depict other non-equality relations, such as hierarchical relations, set relations, bigger-smaller relations or object hyperlinks relations. The edges 1104 may be further differentiated (e.g., by color or style) to illustrate different types of dimension-based relations.

A user can interactively expand the relation graph 228 along a different dimension while navigating it. For example, the user may first select and view document 1. The user then selects one or more fields to form the field set 1 (1106a). Information describing the relation dimensions associated with document 1 may be presented to the user to facilitate the user in the selection process. After the user makes the selection, document (1, 2, 3) that are related to document 1 via field set 1 (1106a) are displayed as child nodes of field set 1. The user may further expand the relation graph 228 by defining field set 2 (1106b). The document (4, 5, 6) which are related via field set 2 (1106b) are displayed as child nodes of field set 2. In addition, the user may also select a set of filters (1110) from document 3 to further expand the graph 228. The related document (7, 8, 9) are displayed as child nodes of the filter set (1110).

By using the relation graph 228 as a navigation aid, the user is able to easily visualize the relations between the documents and to access documents that are related. For example, the user may visualize all the documents used for a particular project. The documents may also be visually arranged in an organizational hierarchy, such that the user is able to see which documents are used by the manager and which documents are used by the manager's subordinates. The user may also visualize which documents are being used by which teams. In some implementations, navigation context may be carried over from one document to another. For example, a drag and drop mechanism may be provided to enable a user to drag an employee report onto a project report, causing the filter to be carried over to the project report such that the user may see the status of employees' tasks in the project report.

In some implementations, filters and parameters of the current (or source) document may provide context for viewing the next (or target) document. Since filters and parameters are also part of the document dimensions, their metadata has already been extracted by the dimension metadata extractor 204, and can be directly applied as context metadata.

One type of context metadata comprises document filter context information. If the source document and the target document have the same filter field in a filter condition, the user may carry over the filter values of the filter condition when navigating to the target document. For example, the filters in the source document and the target document may include a common field, but assigned with different values. When the user navigates from the source document to the target document, the source document's filter may be applied when viewing document 2. Another type of context metadata includes document parameter context information. Parameters related by an equality relation may be carried over from the source document to the target document when viewing the target document.

In addition, the user may customize the context to carry over. For instance, the user may define customized filter and parameter mapping relations to carry over parameters and filter values that are of interest to the user. This feature is particularly useful for parameters and filter values where the equality relation is not recognized.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of visualizing data on a display device, comprising:
   pre-defining, via a user interface, multiple relation dimensions, wherein each relation dimension represents a property about a relation between documents and is associated with a set of attributes;
   extracting dimension metadata from multiple documents;
   populating one or more of the pre-defined relation dimensions with the extracted dimension metadata;
   determining, based on the extracted dimension metadata, one or more relations between the documents along the one or more relation dimensions;
   presenting, on the display device, a relation graph that represents the documents interconnected by the one or more relations; and
   wherein the determining the one or more relations between the documents comprises
      defining at least one hierarchy of dimensions, and
      determining the one or more relations between the documents that use at least one dimension in the hierarchy of dimensions.

2. The method of claim 1 wherein the documents comprise reports.

3. The method of claim 1 wherein the populating the one or more of the relation dimensions comprises storing the extracted dimension metadata by using a document dimension table, wherein each record in the document dimension table corresponds to attribute values of the one or more of the relation dimensions of a single document.

4. The method of claim 1 wherein the presenting the relation graph comprises dynamically rendering the relation graph while a user navigates the relation graph.

5. The method of claim 1 wherein the relation graph comprises nodes interconnected by edges, wherein the nodes represent the documents and the edges are directed and represent the one or more relations.

6. The method of claim 1 wherein the one or more relations comprise a semantic relation, a context relation, a set relation, a hierarchical relation, a numerical relation, or a combination thereof.

7. The method of claim 1 wherein the one or more relations comprise at least one database field relation.

8. The method of claim 7 wherein the determining the one or more relations between the documents comprises:
defining at least one database field set comprising one or more database elements; and
determining the one or more relations between the documents that use at least one database element in the database field set.

9. The method of claim 7 wherein the database field relation comprises a set relation.

10. The method of claim 1 wherein the one or more relations comprise at least one semantic hierarchical relation.

11. The method of claim 1 wherein the one or more relations comprise at least one database hierarchical relation.

12. The method of claim 1 wherein the one or more relations comprise at least one filter relation.

13. The method of claim 12 wherein the determining the one or more relations between the documents comprises comparing filter fields of the documents to determine a filter field relation.

14. The method of claim 12 wherein the determining the one or more relations between the documents comprises identifying a filter set relation between result sub-sets of database fields corresponding to the documents.

15. The method of claim 14 wherein the filter set relation comprises an include relation, a lie-in relation, or an equality relation.

16. The method of claim 12 wherein the determining the one or more relations between the documents comprises identifying a filter semantic relation between filters corresponding to the documents.

17. The method of claim 1 wherein the one or more relations comprise at least one parameter relation.

18. A computer usable medium having a computer readable program code tangibly embodied therein, the computer readable program code adapted to be executed by a processor to implement a method for visualizing data, comprising:

pre-defining, via a user interface, multiple relation dimensions, wherein each relation dimension represents a property about a relation between documents and is associated with a set of attributes;
extracting dimension metadata from multiple documents;
populating one or more of the pre-defined relation dimensions with the extracted dimension metadata;
determining, based on the extracted dimension metadata, one or more relations between the documents along the one or more relation dimensions;
presenting a relation graph that represents the documents interconnected by the one or more relations; and
wherein the determining the one or more relations between the documents comprises
defining at least one hierarchy of dimensions, and
determining the one or more relations between the documents that use at least one dimension in the hierarchy of dimensions.

19. A relation graphing system, comprising:
a non-transitory memory device for storing computer readable program code; and
a processor in communication with the memory device, the processor being operative with the computer readable program code to:
pre-define, via a user interface, multiple relation dimensions, wherein each relation dimension represents a property about a relation between documents and is associated with a set of attributes;
extract dimension metadata from multiple documents;
populate one or more of the pre-defined relation dimensions with the extracted dimension metadata;
determine based on the extracted dimension metadata, one or more relations between the documents along the one or more relation dimensions;
present a relation graph that represents the documents interconnected by the one or more relations; and
wherein the determine the one or more relations between the documents comprises
defining at least one hierarchy of dimensions, and
determining the one or more relations between the documents that use at least one dimension in the hierarchy of dimensions.

* * * * *